United States Patent [19]

Saito et al.

[11] Patent Number: 4,988,129

[45] Date of Patent: Jan. 29, 1991

[54] FLUID PIPE COUPLING

[75] Inventors: Noboru Saito; Haruo Kubo; Naoyuki Kotake; Makoto Nagumo, all of Tokyo, Japan

[73] Assignee: Nitto Kohki Co., Ltd., Tokyo, Japan

[21] Appl. No.: 274,958

[22] Filed: Nov. 22, 1988

[30] Foreign Application Priority Data

Nov. 25, 1987 [JP] Japan .......................... 62-179175[U]

[51] Int. Cl.$^5$ ............................................... F16L 25/00
[52] U.S. Cl. ........................................ 285/328; 285/316; 285/382
[58] Field of Search ............... 285/316, 315, 33, 382, 285/251, 314, 317, 328, 256, 259, 322; 72/703; 29/DIG. 23; 251/149.6

[56] References Cited

U.S. PATENT DOCUMENTS

| | | | |
|---|---|---|---|
| 1,907,397 | 5/1933 | Kosik | 285/382 X |
| 2,209,709 | 7/1940 | Weatherhead | 29/DIG. 23 |
| 3,420,497 | 1/1969 | Wilcox | 285/316 X |
| 3,589,752 | 6/1971 | Spencer | 285/259 X |
| 3,650,507 | 3/1972 | Nyberg | 251/149.6 |
| 3,709,528 | 1/1973 | Cruse | 285/316 |
| 3,761,117 | 9/1973 | Shendure | 285/316 |
| 4,042,262 | 8/1977 | Mooney | 285/330 X |
| 4,148,459 | 4/1979 | Martinez | 285/316 |
| 4,202,184 | 5/1980 | Krude | 285/382 |
| 4,328,979 | 5/1982 | Stoll | 285/322 X |
| 4,370,793 | 2/1983 | Kanamaru | 29/DIG. 23 |
| 4,470,575 | 9/1984 | Stoll | 285/322 X |
| 4,498,658 | 2/1985 | Mikiya | 285/316 X |
| 4,638,975 | 1/1987 | Iuchi et al. | 251/149.6 |
| 4,817,997 | 4/1989 | Ingram | 285/256 |

FOREIGN PATENT DOCUMENTS

| | | | |
|---|---|---|---|
| 2569253 | 2/1986 | France | 285/316 |
| 0011936 | 4/1970 | Japan | 285/382 |
| 8001311 | 6/1980 | PCT Int'l Appl. | 285/316 |
| 1009570 | 4/1983 | U.S.S.R. | 285/382 |

Primary Examiner—Dave W. Arola
Attorney, Agent, or Firm—Nixon & Vanderhye

[57] ABSTRACT

A fluid pipe coupling comprises a plug and a socket, at least one of which includes a cylindrical body member having an end portion adapted to engage the other and a caulking end portion, and an adapter member having a connector end portion adapted to be connected with a pipe member and a caulking end portion. One of the caulking end portions has a cylindrical caulking portion, while the other has a cylindrical caulking receiving portion adapted to engage the caulking portion. The caulking receiving portion has a plurality of annular grooves and annular projections therebetween on the peripheral surface thereof. The caulking portion and the caulking receiving portion engage each other with a seal member interposed therebetween. These two portions are caulked so that the cylindrical body member and the adapter member are coupled integrally with each other.

1 Claim, 4 Drawing Sheets

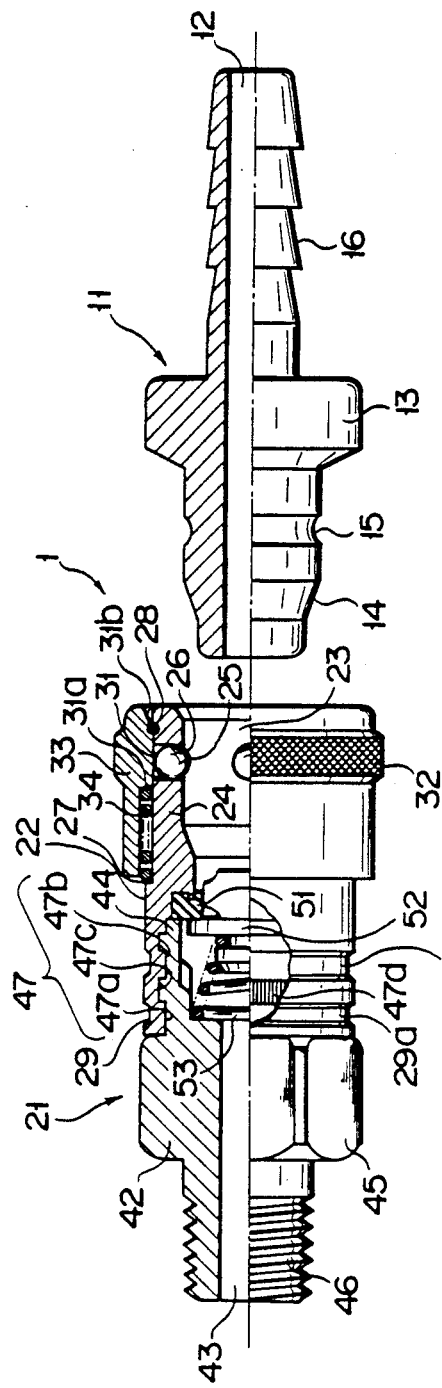
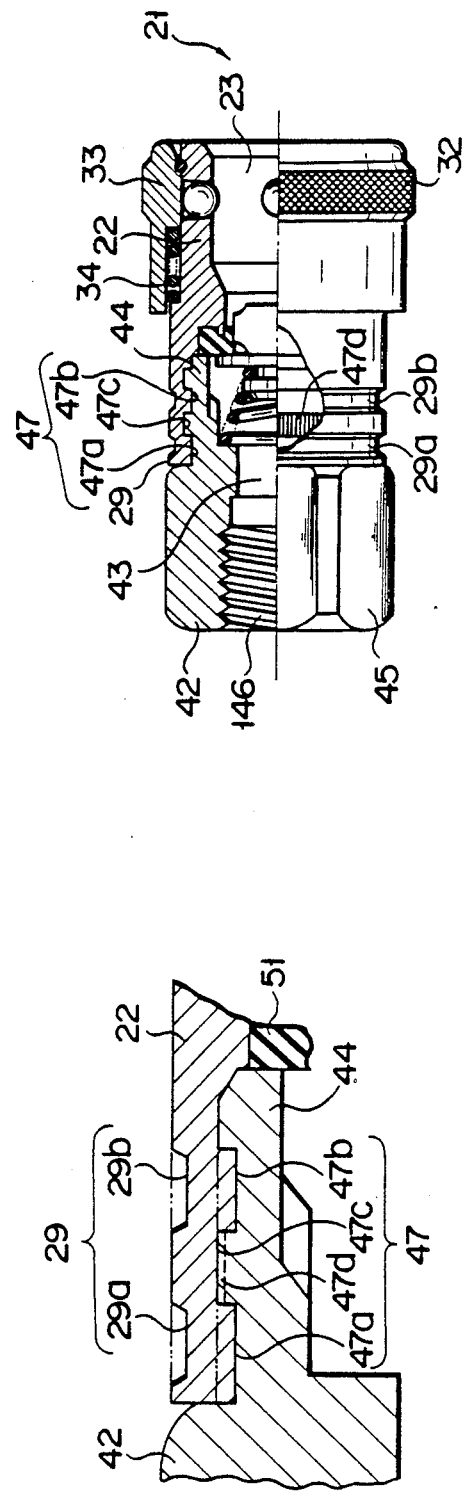

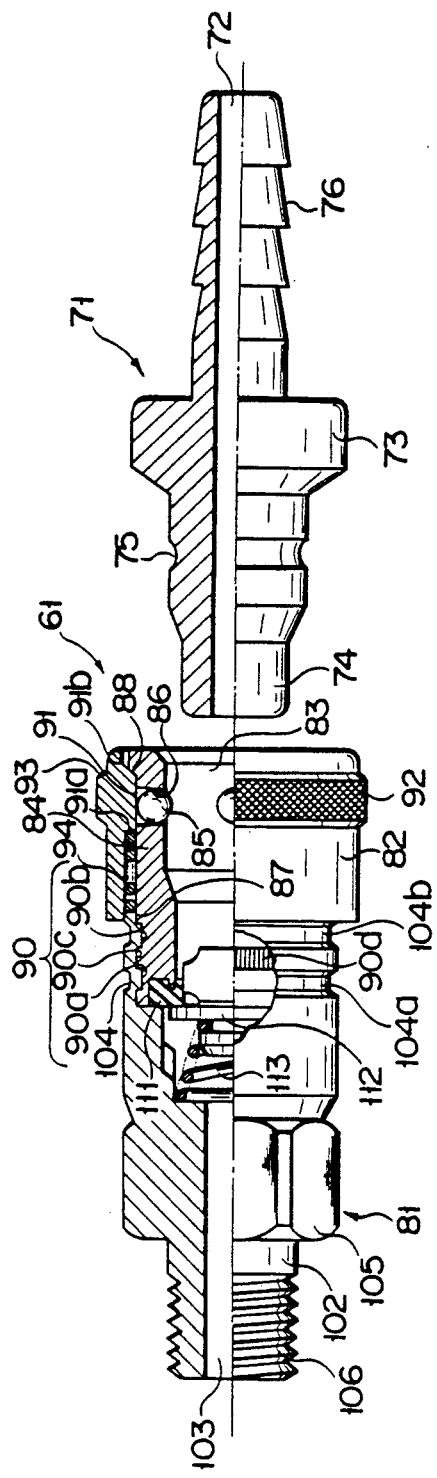
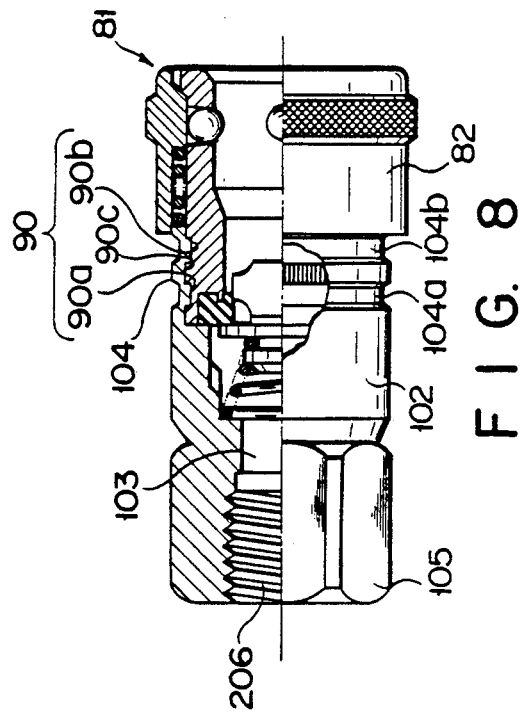
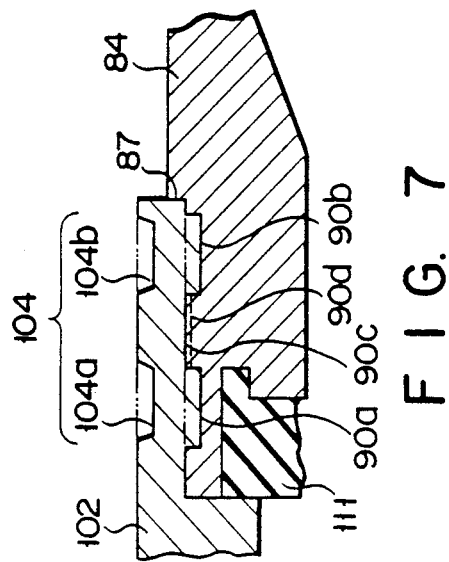
F I G. 6
F I G. 8
F I G. 7

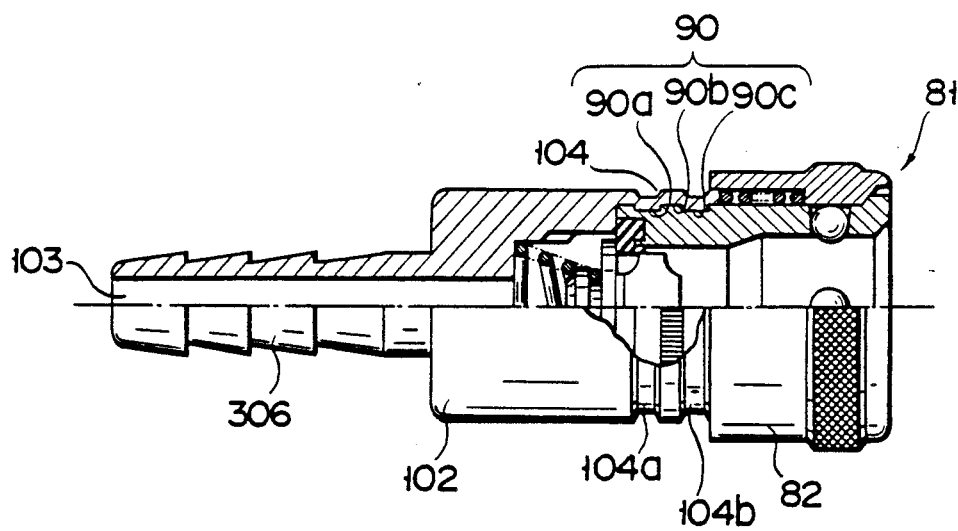
F I G. 9
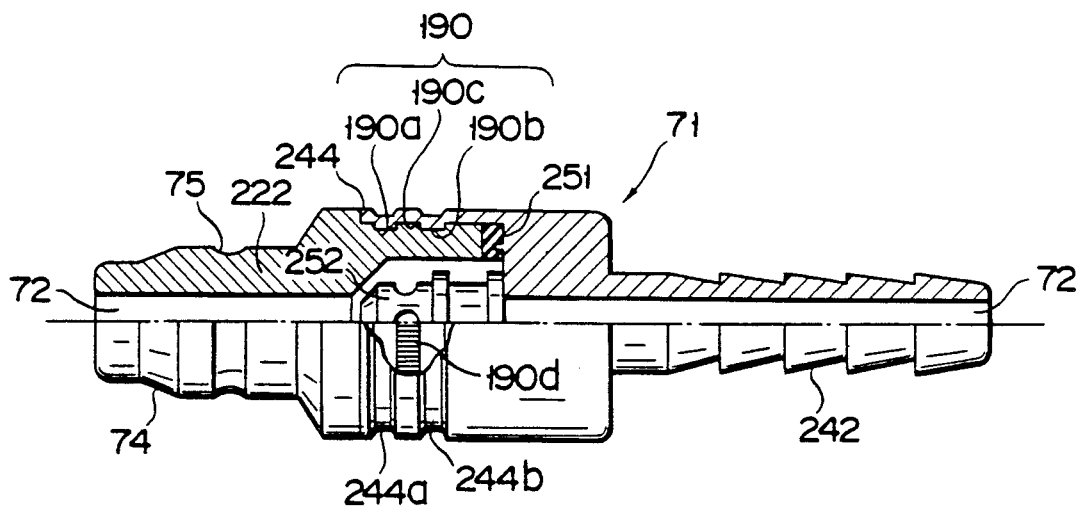
F I G. 10

FLUID PIPE COUPLING

BACKGROUND OF THE INVENTION

1. Field of the Invention

The present invention relates to a fluid pipe coupling used to extend a duct line for the supply and discharge of a fluid to a required length, branch off the line into a suitable number of branch lines, or assemble the duct line from branch lines, in various fluid tools, fluid apparatuses, piping systems for fluids, such as water and air, and the like.

2. Description of the Related Art

Conventionally, fluid pipe coupling are used to extend, branch, or assemble pipes for the supply and discharge of fluids. These connectors comprise, for example, a retention mechanism, valve mechanism, seal mechanism, etc., which are used to quickly connect or disconnect a socket and a plug, main components of each connector.

In the fluid pipe coupling of this type, a cylindrical body member and an adapter are separately formed to contain a valve each, and are joined together by screw coupling.

Such an arrangement, however, requires high-accuracy tapping work and use of tool engaging portions (nuts or the like) for the screw coupling of the body member and the adapter on the body member side, as well as on the adapter side When the body member and the adapter are coupled by screwing, moreover, a seal member, which is interposed between them to improve the airtightness between the two, may possibly be twisted and distorted. In order to prevent loosening of the screw coupling and stabilize the unifying force, furthermore, the clamping torque must be fixed for each individual connector. These requirements entail complicated problems on machining and assembling work.

SUMMARY OF THE INVENTION

The object of the present invention is to provide a fluid pipe coupling which enjoys improved unifying strength between a cylindrical body member and an adapter member of a socket and/or a plug in both axial and circumferential directions, and ensures higher sealing capability of the two members.

The above object is achieved by a fluid pipe coupling constructed as follows.

The fluid pipe coupling comprises a plug having a fluid passage hole, and a socket having a fluid passage hole and a retention mechanism for connection with or disconnection from the plug, wherein at least one of the plug and the socket includes a metal cylindrical body member having a first cylindrical crimpable end section and a second end section adapted to engage with the other of the plug and the socket; a metal adaptor member having a first connector end portion adapted to be connected with a pipe member, and a second cylindrical grooved end section adapted to receive the first crimpable end section; and a seal member disposed between the body member and the adaptor member, wherein the second grooved end section is provided with a plurality of annular grooves and an annular projection between at least a pair of grooves on the peripheral surface thereof. Seating surfaces for the seal member are provided on the cylindrical body member and the adaptor member, respectively, so that when the cylindrical first crimpable end section and the cylindrical second grooved end section are engaged, the seal member is clamped between the seating surfaces without twisting. The cylindrical first crimpable end section is thereafter deformed into engagement with the second grooved end section so that the metal cylindrical body member and the metal adaptor member are integrally coupled.

In the fluid pipe coupling according to the present invention, the unifying strength between the cylindrical body member and the adapter member in the tensile direction is increased by the connection between the inner peripheral surface of the cylindrical first crimpable end section and the annular grooves and projections of the cylindrical second grooved end section while the unifying strength in the rotating direction is increased by the biting engagement between the inner peripheral surface of the first crimpable end section and the irregularly portions o f the annular projections of the second grooved end section.

During the crimping operation, the seal member, interposed between the cylindrical body member and the adapter member, is subjected to a compressive force. It is not, however, subjected to any twisting force, so that it cannot be damaged. Thus, the gap between the body member and the adapter member can be securely sealed.

BRIEF DESCRIPTION OF THE DRAWINGS

FIG. 1 is a side view, partially in section, showing a socket and a plug of a fluid pipe coupling according to a first embodiment of the present invention;

FIG. 2 is a partial sectional view of a first crimpable end section and second grooved end section portion of the socket shown in FIG. 1;

FIG. 3 is a side view, partially in section, showing a socket of a fluid pipe coupling according to a second embodiment of the invention;

FIG. 6 is a side view, partially in section, showing a socket and a plug of a fluid pipe coupling according to a fifth embodiment of the invention; .

FIG. 7 is a partial sectional view of a crimped portion of the socket shown in FIG. 6;

FIG. 8 is a side view, partially in section, showing a socket of a fluid pipe coupling according to a sixth embodiment of the invention;

FIG. 9 is a side view, partially in section, showing a socket of a fluid pipe coupling according to a seventh embodiment of the invention; and FIG. 10 is a side view, partially in section, showing a plug of a fluid pipe coupling according to an eighth embodiment of the invention.

DETAILED DESCRIPTION OF THE PREFERRED EMBODIMENTS

Figure 4:
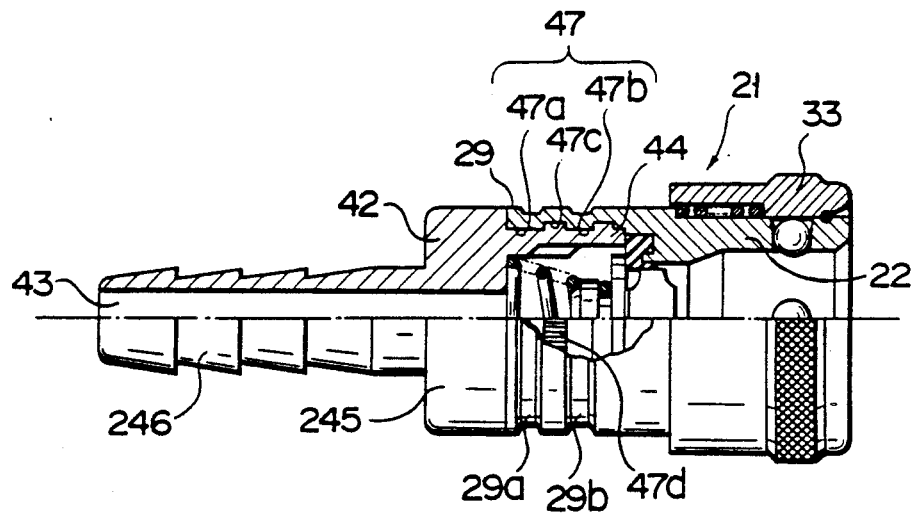
FIG. 4 is a side view, partially in section, showing a socket of a fluid pipe coupling according to a third embodiment of the invention.

FIGS. 1 and 2 show a first embodiment of the present invention. Fluid pipe coupling 1 shown in FIG. 1 comprises plug 11 and socket 21. For example, plug 11 is connected to the fluid-consumption side of a duct line which is used to supply and discharge a fluid, while socket 21 is connected to the fluid-supply side of the line.

Plug 11 has fluid passage hole 12 along its central axis, large-diameter portion 13 in the middle, socket fitting portion 14 at one end portion thereof, and hose nipple portion 16 at the other end portion. Lock ball engaging groove 15 is formed on the outer peripheral surface of fitting portion 14. Nipple portion 16 can be connected with a hose which is coupled to a fluid consumption apparatus (not shown).

Socket 21 is composed of cylindrical body member 22 and adapter 42. Body member 22 includes plug fitting portion 23 on the front side, in which socket fitting portion 14 of plug 11 is to be fitted. Four taper retaining holes 26 for lock balls 25 are formed circumferentially at regular intervals, on cylindrical portion 24 which constitutes fitting portion 23. Coil spring retaining portion 27 is formed on the outer peripheral surface of cylindrical portion 24. Also, sleeve 33 is fitted on portion 24 for axial sliding motion. Sleeve 33 has inward ridge portion 31 and projected operating portion 32 on its inner and outer peripheral surfaces, respectively. Ridge portion 31 serves to press lock balls 25 inward. Coil spring 34 is disposed between retaining portion 27 and side wall portion 31a of inward ridge 31 of sleeve 33. Sleeve stopper ring 28 is provided at the front end of cylindrical portion 24. It is adapted to engage slant-side wall surface portion 31b of inward ridge portion 31, thereby preventing disengagement of sleeve 33 which is pushed to the right of FIG. 1 by spring 34. When sleeve 33 is slid to the left of FIG. 1 against the urging force of spring 34, a release space for lock balls 25 is formed between surface portion 31b and ring 28. At the rear portion of socket body member 22 as shown in FIG. 2, cylindrical first crimpable end section 29 extends from the rear end of cylindrical portion 24. Imaginary lines of FIG. 2 indicate the state of the first crimpable end section 29 before crimping or deforming.

Adapter 42 has fluid passage hole 43 along its central axis. Cylindrical portion 44, which is formed on the outer periphery of the front portion of adapter 42, is adapted to be fitted in cylindrical first crimpable end section 29. Adapter 42 further has nut portion 45 and male screw portion 46. As shown in FIG. 2, a rugged second grooved end portion 47 is formed circumferentially on cylindrical portion 44. It includes two annular grooves 47a and 47b and annular projection 47c between them. Axial grooves 47d are formed on the peripheral surface of projection 47c by knurling. Alternatively, the irregular portion 47d may be formed by rough finishing.

In assembling socket 21, cylindrical portion 44 of adapter 42 is fitted into cylindrical crimpable end section 29 of cylindrical body member 22 of the socket. As a result, crimpable end section 29 is crimped or deformed along the two annular grooves 47a and 47b of rugged portion 47 throughout the circumference thereof. Thus, crimped engagement lines 29a and 29b are formed. At the same time, the inner peripheral surface of first crimpable end section 29 is caused to bite into irregular portion 47d of annular projection 47c, so that socket body member 22 and adapter 42 are coupled integrally with each other. The resulting socket body has high strength in both axial and circumferential directions.

Ring-shaped seal member 51, which doubles as a valve seat, is disposed between socket body member 22 and adapter 42 which are coupled in this manner. Valve 52 is adapted to engage seal member 51, thereby shutting off fluid passage holes 12 and 43. The valve is pressed toward seal member 51 by means of coil spring 53 in the shape of a truncated cone, thus closing hole 12.

Then, in connecting plug 11 and socket 21, sleeve 33 in the state of FIG. 1 is slid to the left against the urging force of coil spring 34. Thereupon, lock balls 25 are allowed to move into the lock ball release space which is defined by slant-side wall surface portion 31b of sleeve 33. In this state, socket fitting portion 14 of plug 11 is fitted into plug fitting portion 23 of socket 21. When these portions fully engage each other, taper retaining holes 26 for balls 25 are aligned with lock ball engaging groove 15. If sleeve 33 is unhanded when this state is attained, it is moved to the right by the repulsive force of coil spring 34. While sleeve 33 is moving in this manner, lock balls 25 are pushed into retaining holes 26 by wall surface portion 31b, so that they engage retaining groove 15 on plug 11. Thus, inward ridge portion 31 of sleeve 33 regulates the position of balls 25 so that plug 11 and socket 21 are fully connected to each other. The moment plug 11 is fitted into socket 21, valve 52 is pushed to the left of FIG. 1 by the front end of plug 11, to be disengaged from the valve seat or seal member 51. Thus, the connection between fluid passage holes 12 and 43 is maintained.

In disconnecting plug 11 and socket 21 in the connected state, sleeve 33 is slid to the left of FIG. 1, thereby forming the lock ball release space between slant-side surface wall portion 31b and sleeve stopper ring 28. Thereupon, lock balls 25 are allowed to move easily toward the release space, so that socket 21 and plug 11 can be readily disengaged from each other by means of the repulsive force of truncated-cone-shaped coil spring 53 or by pulling them apart. While socket 21 and plug 11 are being separated, balls 25 move to the release space, and valve 52 abuts against seal member 51, thereby preventing the fluid from leaking out.

FIG. 3 shows a second embodiment of the present invention. In socket 21 of fluid pipe coupling 1 of the first embodiment shown in FIG. 1, male screw portion 46 for connection with, e.g., the fluid-supply side is provided at an end portion of adapter 42. In socket 21 of a fluid pipe coupling shown in FIG. 3, on the other hand, female screw portion 146 for the same purpose is provided at the end portion of the adapter. Socket body member 22 of the second embodiment is constructed just in the same manner as body member 22 shown in FIG. 1. More specifically, adapter 42 has fluid passage hole 43 along its central axis, cylindrical portion 44 adapted to be fitted in cylindrical first crimpable end section 29 of body member 22, and nut portion 45. The rugged second grooved end portion 47 is formed circumferentially on cylindrical portion 44. It includes two annular grooves 47a and 47b and annular projection 47c between them. Axial irregular portion 47d is formed on projection 47c by knurling. In assembling socket 21 according to the second embodiment, cylindrical portion 44 of adapter 42 is fitted into cylindrical first crimpable end section 29 of socket body member 22. Then, press fit portion 29 is crimped or deformed along two annular grooves 47a and 47b of rugged portion 47 throughout the circumference thereof. Thus, crimped engagement lines 29a and 29b are formed. At the same time, the inner peripheral surface of crimpable end section 29 is caused to bite into irregular portion 47d of annular projection 47c, so that socket body member 22 and adapter 42 are coupled integrally with each other. The resulting integral socket has high strength in both axial and circumferential directions.

In connecting socket 21 and plug 11, sleeve 33 in the state of FIG. 3 is slid to the left against the urging force of coil spring 34, just as in the case of the first embodiment. In this state, plug 11 is fitted into socket 21, whereupon sleeve 33 is unhanded.

FIG. 4 shows a third embodiment of the present invention. Socket 21 of a fluid pipe coupling shown in FIG. 4 is provided with hose nipple portion 246. Socket body member 22 of this third embodiment is also constructed just in the same manner as body member 22 shown in FIG. 1. More specifically, adapter 42 has fluid passage hole 43 along its central axis, and cylindrical portion 44 adapted to be fitted in cylindrical crimpable end section 29 of body member 22. Unlike the adapters of the foregoing embodiments, however, adapter 42 of the third embodiment is not formed with a screw portion (46 or 146), and has large-diameter portion 245 with a circular cross section. Thus, the adapter does not require a nut portion which is to be tightened by means of a tool required in conventionally coupling the socket body member and the adapter by screwing. Rugged second grooved end section 47 is formed circumferentially on cylindrical portion 44. It includes two annular grooves 47a and 47b and annular projection 47c between them. Axial irregular portion 47d is formed on projection 47c by knurling. In assembling socket 21 according to the third embodiment, cylindrical first crimpable end section 29 is crimped or deformed along two annular grooves 47a and 47b of rugged portion 47 throughout the circumference thereof. Thus, crimped engagement lines 29a and 29b are formed. At the same time, the inner peripheral surface of first crimpable end section 29 is caused to bite into irregular portion 47d of annular projection 47c, so that socket body member 22 and adapter 42 are coupled integrally with each other. The resulting integral socket body has high strength in both axial and circumferential directions. Although first crimpable end section 29 should preferably be crimped throughout the circumference, it may alternatively be crimped only partially.

In connecting socket 21 and plug 11, sleeve 33 in the state of FIG. 4 is slid to the left against the urging force of coil spring 34, just as in the case of the first embodiment. In this state, plug 11 is fitted into socket 21, whereupon sleeve 33 is unhanded.

Figure 5:
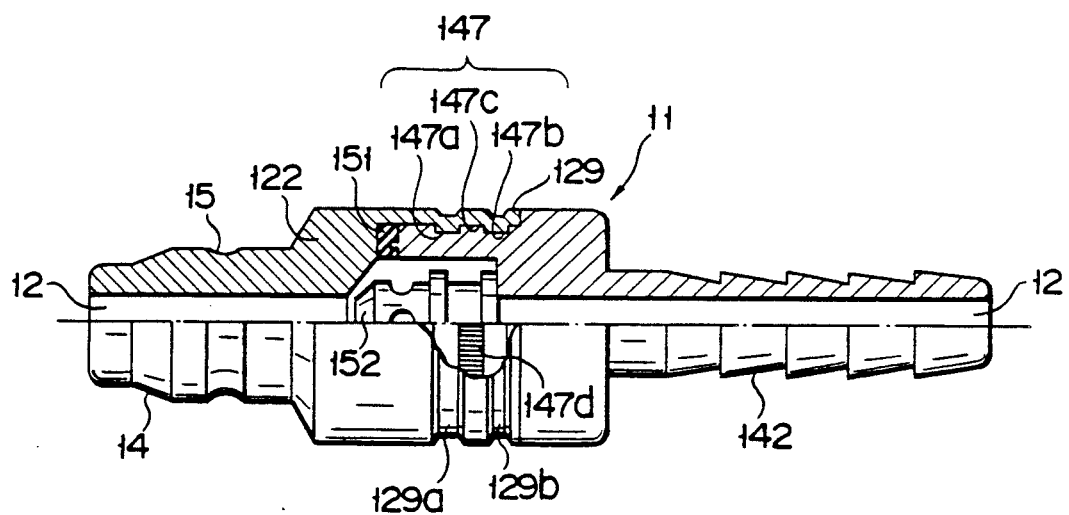
FIG. 5 is a side view, partially in section, showing a plug of a fluid pipe coupling according to a fourth embodiment of the invention.

Although socket 21 has been described in connection with the embodiments shown in FIGS. 1 to 4, the present invention may be also applied to a plug which has a valve built-in. In this fourth embodiment, as shown in FIG. 5, valve 152 for controlling fluid passage hole 12 is disposed inside cylindrical plug body member 122, and cylindrical first crimpable end section 29 is formed at the rear portion of member 122. Rugged second grooved end section 147, which includes two annular grooves 147a and 147b and annular projection 147c between them, is formed circumferentially on the front portion of adapter 142. Seal member 151 is interposed between plug body member 122 and adapter 142. In assembling the plug according to the fourth embodiment, cylindrical first crimpable end section 129 is crimped or deformed along two annular grooves 147a and 147b of rugged portion 147 throughout the circumference thereof. Thus, crimped engagement lines 129a and 129b are formed. At the same time, the inner peripheral surface of crimpable end section 129 is caused to bite into irregular portion 147d formed on annular projection 147c, so that plug body member 122 and adapter 142 are coupled integrally with each other. The resulting integral plug has high strength in both axial and circumferential directions. It is to be understood that adapter 142 for plug 11 may be of the male- or female-screw type, as well as the hose-nipple type as illustrated.

Since cylindrical body members 22 and 122 of socket 21 and plug 11 have the same construction without regard to the type of adapters 42 and 142, they can be used in common. Moreover, body members 22 and 122 and adapters 42 and 142 are crimped or deformed without being coupled by screwing, so that they need not be formed with any screw portions for connection. Also, members 22 and 122 need not be provided with tool engaging portions (nuts or the like) for screw connection. Thus, according to the fluid pipe coupling of the present invention, the processes of assembling work can be reduced in number.

FIGS. 6 and 7 show a fifth embodiment of the present invention. Fluid pipe coupling 61 shown in FIG. 6 comprises plug 71 and socket 81. For example, plug 71 is connected to the fluid-consumption side of a duct line used to supply and discharge a fluid, while socket 81 is connected to the fluid-supply side of the line.

Plug 71 has fluid passage hole 72 along its central axis, large-diameter portion 73 in the middle, socket fitting portion 74 at one end portion thereof, and nipple portion 76 at the other end portion. Lock ball engaging groove 75 is formed on the outer peripheral surface of fitting portion 74. Nipple portion 76 can be connected with a hose which is coupled to a fluid consumption apparatus (not shown).

Socket 81 is composed of cylindrical body member 82 and adapter 102. Body member 82 includes plug fitting portion 83, in which socket fitting portion 74 of plug 71 is to be fitted. Four taper retaining holes 86 for lock balls 85 are formed circumferentially at regular intervals, on cylindrical portion 84 which constitutes fitting portion 83. Retaining portion 87 for adapter 102 is formed on the outer peripheral surface of cylindrical portion 84. Also, sleeve 93 is fitted on portion 84 for axial sliding motion. Sleeve 93 has inward ridge portion 91 and projected operating portion 92 on its inner and outer peripheral surfaces, respectively. Ridge portion 91 serves to press lock balls 85 inward. Coil spring 94 is disposed between the front end of adapter 102 retained by retaining portion 87 and side wall portion 91a of inward ridge 91 of sleeve 93. Sleeve stopper 88 is provided at the front end of cylindrical portion 84. It is adapted to engage slantside wall surface portion 91b of inward ridge portion 91, thereby preventing disengagement of sleeve 93 which is pushed to the right of FIG. 6 by spring 94. Stopper 88 is formed by plastically bulging the periphery of the end of cylindrical portion 84 outward. When sleeve 93 is slid to the left of FIG. 6 against the urging force of spring 94, a lock ball release space is formed between surface portion 91b and stopper 88. As shown in FIG. 7, rugged grooved end section 90 is formed circumferentially on the outer peripheral surface of the rear portion of socket body member 82. It includes two annular grooves 90a and 90b and annular projection 90c between them. Axial irregular portion 90d is formed on projection 90c by knurling.

Adapter 102 has fluid passage hole 103 along its central axis. Cylindrical crimpable end section 104, which is formed on the outer periphery of adapter 102, is adapted to be fitted on rugged second grooved end section 90, as shown in FIG. 7. Imaginary lines of FIG. 7 indicate the state of crimpable end section 104 before crimping or deforming. Adapter 102 further has nut portion 105 and male screw portion 106. In assembling socket 81, crimpable end section 104 is fitted onto rugged portion 90 of cylindrical body member 82 of the socket, and is then crimped or deformed along two annular grooves 90a and 90b of rugged portion 90 throughout the circumference thereof. Thus, crimped engagement lines 104a and 104b are formed. At the same time, the inner peripheral surface of crimpable end section 104 is caused to bite into irregular portion 90d of annular projection 90c, so that socket body member 82 and adapter 102 are coupled integrally with each other. The resulting integral socket body has high strength in both axial and circumferential directions.

Ring-shaped seal member 111, which doubles as a valve seat, is disposed between socket body member 82 and adapter 102 which are coupled in this manner. Valve 112 is adapted to engage seal member 111, thereby shutting off fluid passage holes 72 and 103. The valve is pressed toward seal member 111 by means of coil spring 113 in the shape of a truncated cone, thus closing hole 103.

In connecting socket 81 and plug 71, sleeve 93 in the state of FIG. 6 is slid to the left against the urging force of coil spring 94, just as in the case of the first embodiment. In this state, plug 71 is fitted into socket 81, whereupon sleeve 93 is unhanded.

FIG. 8 shows a sixth embodiment of the present invention. In socket 81 of fluid pipe coupling 61 of the fifth embodiment shown in FIG. 6, male screw portion 106 for connection with, e.g., the fluid-supply side is provided at an end portion of adapter 102. In socket 81 of a fluid pipe coupling shown in FIG. 8, on the other hand, female screw portion 206 for the same purpose is provided at the end portion of the adapter. Socket body member 82 of the sixth embodiment is constructed just in the same manner as body member 82 shown in FIG. 6. More specifically, adapter 102 has fluid passage hole 103; along its central axis, cylindrical crimpable end section 104 adapted to be fitted on rugged second grooved end section 90 of body member 82, and nut portion 105. In assembling socket 81, crimpable end section 104 is crimped or deformed along two annular grooves 90a and 90b of rugged portion 90 throughout the circumference thereof. Thus, crimped engagement lines 104a and 104b are formed. At the same time, the inner peripheral surface of caulking crimpable end section 104 is caused to bite into irregular portion 90d of annular projection 90c, so that socket body member 82 and adapter 102 are coupled integrally with each other. The resulting integral socket body has high strength in both axial and circumferential directions. Socket 81 and plug 71 can be connected in the same manner as in the case of the first embodiment.

FIG. 9 shows a seventh embodiment of the present invention. Socket 81 of a fluid pipe coupling shown in FIG. 9 is provided with hose nipple portion 306. Socket body member 82 of this sixth embodiment is also constructed just in the same manner as body member 82 shown in FIG. 6. More specifically, adapter 102 has fluid passage hole 103 along its central axis, and cylindrical crimpable end section 104 adapted to be fitted on rugged second grooved end section 90 of body member 82. Unlike the adapters of the fifth and sixth embodiments, however, adapter 102 of the seventh embodiment is not formed with a screw portion (106 or 206), and has a circular cross section. Thus, the adapter does not require a nut portion which is to be tightened by means of a tool required in conventionally coupling the socket body member and the adapter by screwing. Rugged second grooved end section 90 is formed circumferentially on the outer peripheral surface of the rear portion of socket body member 82. In assembling socket 81, cylindrical crimpable end section 104 is crimped or deformed along two annular grooves 90a and 90b of rugged portion 90 throughout the circumference thereof. Thus, crimped engagement lines 104a and 104b are formed. At the same time, teh inner peripheral surface of crimpable end section 104 is caused to bite into irregular portion 90d of annular projection 90c, so that socket body member 82 and adapter 102 are coupled integrally with each other. The resulting integral socket body has high strength in both axial and circumferential directions. Although crimpable end section 104 should preferably be crimped throughout the circumference, it may alternatively be crimped only partially. Socket 81 and plug 71 can be connected in the same manner as in the case of the first embodiment.

Although the socket has been described in connection with the embodiments shown in FIGS. 6 to 9, the present invention may be also aplied to a plug which has a valve built-in. In this eight embodiment, as shown in FIG. 10, valve 252 for controlling fluid passage hole 72 is disposed inside cylindrical plug body member 222, and rugged second grooved end section 190, which includes two annular grooves 190a and 190b and annular projection 190c between them, is formed circumferentially on the outer peripheral surface of the rear portion of body member 222. Axial irregular portion 190d is formed on projection 190c by knurling. Also, cylindrical crimpable end section 244 is formed on the front portion of adapter 242, as in the case of adapter 82 of socket 81. In assembling plug 71, crimpable end section 244 is fitted onto rugged portion 190, and is then crimped or deformed along two annular grooves 190a and 190b of rugged portion 190 throughout the circumference thereof.

Thus, crimped engagement lines 244a and 244b are formed. At the same time, the inner peripheral surface of crimpable end section 244 is caused to bite into irregular portion 190d of annular projection 190c, so that plug body member 222 and adapter 242 are coupled integrally with each other with seal member 251 between them. The resulting integral plug has high strength in both axial and circumferential directions. It is to be understood that adapter 242 for plug 71 may be of the male- or female-screw type, as well as the hose-nipple type as illustrated.

Since cylindrical body members 82 and 222 of socket 81 and plug 71 have the same construction without regard to the type of adapters 102 and 242, they can be used in common. Moreover, body members 82 and 222 and adapters 102 and 242 are crimped or deformed without being coupled by screwing, so that they need not be formed with any screw portions for connection. Also, members 82 and 222 need not be provided with tool engaging portions (nuts or the like) for screw connection. Thus, according to the fluid pipe coupling of the present invention, the processes of assembling work can be reduced in number.

In the embodiments shown in FIGS. 1 to 10, sockets 21 and 81 and plugs 11 and 71 shown in FIGS. 5 and 10 are provided with valves 52, 112, 151 and 252, respectively. However, the present invention may be also applied to sockets and plugs which have no valves.

What is claimed is:

1. A fluid pipe coupling which comprises a plug having a fluid passage hole, and a socket having a fluid passage hole and a retention mechanism for connection with or disconnection from the plug; wherein at least one of the plug and the socket includes a metal body member having a first cylindrical crimpable end section and a second end section adapted to engage with the other of the plug and the socket; a metal adapter member having a first connector end portion adapted to be connected with a pipe member and a second cylindrical grooved end section; and a seal member disposed between the body member and the adapter member;

the second cylindrical grooved end section having at least a pair of annular grooves and an annular projection formed between said pair of annular grooves, for holding said first cylindrical crimpable end section on an outer peripheral surface of said second cylindrical grooved end section, the annular projection having on its entire peripheral surface a plurality of straight grooves extending in an axial direction of the fluid pipe coupling;

first and second seat surfaces for the seal member formed on the body member and the adapter member, respectively;

wherein the first cylindrical crimpable end section is adapted to be deformed into crimped engagement with the second cylindrical grooved end section so that the body member and the adapter member are integrally coupled, said plurality of straight grooves preventing relative rotation between said body member and said adapter member, and wherein the seal member is sealingly clamped between the seat surfaces without twisting.

* * * * *